(12) United States Patent
Mikami et al.

(10) Patent No.: US 6,249,195 B1
(45) Date of Patent: Jun. 19, 2001

(54) DIELECTRIC FILTER, DIELECTRIC DUPLEXER, AND TRANSCEIVER HAVING CIRCULAR AND POLYGONAL ELECTRODE OPENINGS

(75) Inventors: Shigeyuki Mikami, Nagaokakyo; Toshiro Hiratsuka, Kusatsu; Tomiya Sonoda, Muko; Kiyoshi Kanagawa, Nagaokakyo, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/391,289

(22) Filed: Sep. 7, 1999

(30) Foreign Application Priority Data

Sep. 7, 1998 (JP) .................................................. 10-252747

(51) Int. Cl.[7] ................................ H01P 7/10; H01P 1/20; H01P 1/213

(52) U.S. Cl. ........................ 333/134; 333/219.1; 333/202
(58) Field of Search ................................ 333/202, 219.1, 333/134

(56) References Cited

U.S. PATENT DOCUMENTS 6,104,261 * 8/2000 Sonoda et al. ...................... 333/202

* cited by examiner

*Primary Examiner*—Benny Lee
*Assistant Examiner*—Stephen E. Jones
(74) *Attorney, Agent, or Firm*—Ostrolenk, Faber, Gerb & Soffen, LLP

(57) ABSTRACT

A dielectric filter provided in this invention has insertion-loss characteristics of 2 dB or lower in the range of 1 to 2% of a specific band. The dielectric filter includes an upper case and a lower case, a dielectric substrate, an electrode formed on mutually opposing surfaces thereof, and a plurality of pairs of openings formed in the electrodes on the two opposing surfaces, so as to form a plurality of dielectric resonators, and input-output couplers for coupling to each of an input-stage dielectric resonator and an output-stage dielectric resonator among the plurality of dielectric resonators. In the input-stage and output-stage dielectric resonators, the opening of the electrode is rectangular or polygonal, whereas in at least one of the dielectric resonators other than the input-stage and output-stage dielectric resonators, it is substantially circular.

17 Claims, 11 Drawing Sheets

DIELECTRIC FILTER, DIELECTRIC DUPLEXER, AND TRANSCEIVER HAVING CIRCULAR AND POLYGONAL ELECTRODE OPENINGS

BACKGROUND OF THE INVENTION

1. Field of the Invention

The present invention relates to dielectric filters, dielectric duplexers, and transceivers for use in micro-wave or millimeter-wave communications.

2. Description of the Related Art

With the shift toward using frequencies in the micro-wave band and the millimeter-wave band, a plane-circuit type dielectric filter including dielectric resonators has been proposed, in which installation of the dielectric resonators and formation of configurations thereof can be easily and elaborately conducted by patterning of an electrode.

FIG. 8 illustrates a first embodiment of a conventional dielectric filter. The figure shows an exploded perspective view of the conventional dielectric filter.

As shown in FIG. 8, a conventional dielectric filter 110a includes a dielectric substrate 120a having an electrode formed on mutually opposing surfaces thereof, a lower case 112, and an upper case 111. In the electrode formed on the front surface of the dielectric substrate 120a, electrodeless portions or openings 121a through 121e are formed, whereas at opposing positions in the electrode formed on the back surface of the substrate, other electrodeless portions (not shown) having the same configuration as those on the front side are formed. Dielectric resonators 122a through 122e are composed of the parts defined by the openings 121a through 121e and the upper and lower cases 111 and 112. The resonance frequency is determined by the configuration of the openings 121a through 121e and the thickness of the dielectric substrate 120a, and other well-known factors.

The lower case 112 is composed of a substrate 113 and a metal frame 114 mounted thereon, and the dielectric substrate 120a is mounted on the metal frame 114, inside of which a step 115 is formed. An electrode 116 is formed on a surface of the substrate 113. Furthermore, input-output micro-strip lines 130 and 131 are formed on the surface of the substrate 113 as input-output couplers, and an electrode (not shown) is formed on substantially the entire back surface of the substrate 113.

The dielectric substrate 120a is mounted on the step 115 inside the lower case 112, in which the substrate 120a is fixed by a conductive adhesive material or the like. The upper case 111 is fixed on the metal frame 114 of the lower case 112. When input signals are input to the micro-strip line 130, the micro-strip line 130 and the dielectric resonator 122a are electromagnetically coupled and the dielectric resonator 122a resonates in the TE010 mode. Since the adjacent dielectric resonators 122a through 122e are electromagnetically coupled as well, signals are output from the micro-strip line 131 on the output side. In this case, the dielectric filter 110a serves as a five-stage band pass filter.

The unloaded Q (hereinafter referred to as Q0) of the TE010-mode dielectric resonator is higher than the Q0 of a rectangular-slot mode dielectric resonator, which will be described below. For example, in the 26 GHz band, Q0 of a TE010-mode dielectric resonator is approximately 1900, whereas Q0 of a rectangular-slot mode dielectric resonator is approximately 700. As shown here, since Q0 of the dielectric resonator is higher when the TE010 mode is used, a dielectric filter with small insertion losses can be obtained.

A second conventional dielectric filter will be illustrated by referring to FIG. 9. FIG. 9 shows an exploded perspective view of a conventional dielectric filter, in which the same parts as those in the first conventional dielectric filter shown in FIG. 8 are given the same reference numerals and thus detailed explanations thereof are omitted.

In the conventional dielectric filter 110b shown in FIG. 9, the configurations of openings 123a through 123e of an electrode formed on a dielectric substrate 120b are rectangular, which are different from those in the first conventional example. These openings form dielectric resonators 124a through 124e. Making the configurations of the openings 123a through 123e rectangular permits the resonance mode to be the rectangular-slot mode. Since the rectangular-slot mode weakens the degree of confinement of the electromagnetic field, the coupling (hereinafter referred to as Qe) between the dielectric resonators and the input-output couplers, and the coupling between the dielectric resonators 124a through 124e can be facilitated.

Regarding the above description of FIGS. 8 and 9, an illustration will be given by referring to graphs shown in FIGS. 10 and 11.

FIG. 10 is a graph showing the relationship between Qe and the distances between the input-output couplers and the dielectric substrate, in which the solid line indicates the TE010-mode dielectric resonator and the broken line indicates the rectangular-slot mode dielectric resonator. In FIG. 10, as well as in FIG. 9, it can be seen that the rectangular-slot mode permits coupling between the input-output couplers and the dielectric resonators to be facilitated. FIG. 11 shows a graph indicating the relationship between the coupling coefficients and the distances between the openings of the electrode forming the dielectric resonators, in which the solid line indicates the TE010-mode resonator and the broken line indicates the rectangular-slot mode dielectric resonator. In FIG. 11, as well as in FIGS. 10 and 9, it is shown that the rectangular-slot mode permits coupling between the dielectric resonators to be facilitated.

Meanwhile, in the field of high-frequency technology, the demand for improved characteristics has recently increased, such that dielectric filters having insertion losses of approximately 2 dB or lower are now being required.

The invention provides an improvement in the insertion loss characteristic of a dielectric filter with respect to its specific band. "Specific band" is defined by the following formula:

Specific band=(design band width/design central frequency)×100%

The response characteristics of a filter (insertion loss, and out-of-band attenuation) depend on design band width, the order of the filter, and the unloaded Q of a resonator forming the filter, etc. Relationships between the values of these parameters and the insertion loss and attenuation of the filter are as follows:

TABLE 1

| Insertion Loss | | |
| --- | --- | --- |
| Design band width | wide | narrow |
| Order of the filter | small | large |
| Unloaded Q | large | small |
| Insertion loss | small | large |

TABLE 2

| Attenuation Outside Passband | | |
|---|---|---|
| Order of the Filter | small | large |
| Attenuation outside the pass band | small | large |

In designing response characteristics of a filter, the above relationships are considered and each parameter is adjusted.

As shown in the above Table 1, the wider the design band width, the smaller the insertion loss of the filter. That is, the insertion loss of a filter which exhibits a large specific band is small. Also, the smaller the order of the filter, the smaller the insertion loss; and the larger the unloaded Q, the smaller the insertion loss.

As shown in Table 2, the order of the filter affects the amount of attenuation outside the passband.

When using a TE010 mode resonator (circular shape) for forming a filter, a relatively small design band width can be realized. The unloaded Q of the resonator (1/the loss of the resonator) is large.

On the other hand, a rectangular slot resonator realizes a wide design band width. But, its unloaded Q is small.

An ideal resonator to minimize the insertion loss of a filter should be able to realize a wide design band width and a large unloaded Q as shown in Table 1. But, in practice, a TE010 mode resonator is not able to realize as wide a design band width as a rectangular resonator. This results in the filter having excessive insertion loss. Further, since the rectangular resonator has a wide band width, its unloaded Q is small, which also increases the insertion loss.

FIG. 12 is a graph showing the relationship between the specific band and the insertion loss in a conventional dielectric filter. In this figure, the solid line indicates the first conventional dielectric filter, and the broken line indicates the second conventional dielectric filter.

As shown in FIG. 12, in the first conventional dielectric filter using the TE010 mode, in which Q0 is higher and insertion losses are thereby reduced, since the coupling between the dielectric resonators and the input-output couplers and the coupling between the dielectric resonators are weak, the dielectric filter is usable in narrow specific band filters whose specific band is less than 1%.

However, the second conventional dielectric filter using the rectangular-slot mode can be used with a specific band in the range of 1% or greater. In the range of 2% or greater of the specific band, insertion losses are 2 dB or lower, so that the required characteristics are obtained in wide specific band filters whose specific band is 2% or more. However, insertion losses increase in the range of 1% to 2% of the specific band, so the rectangular resonator has not been used in filters having a narrow specific band, where the narrow specific band and the small unloaded Q result in a filter having a large insertion loss.

SUMMARY OF THE INVENTION

The present invention is able to solve these problems and provide improved insertion-loss characteristics. The invention provides a dielectric filter, a dielectric duplexer, and a transceiver having insertion-loss characteristics that meet required characteristics even with a specific band in the range of 1% to 2%.

It has been found that when a medium design band width (specific band ranging from 1 to 2%) and acceptable (relatively small) insertion loss are simultaneously desired, it is effective to use a hybrid of a TE010 mode resonator and a rectangular resonator.

To this end, according to one aspect of the present invention, there is provided a dielectric filter including a plurality of dielectric resonators which include a dielectric substrate, an electrode formed on mutually opposing surfaces thereof, a plurality of pairs of openings formed in the electrodes on both surfaces, and a conductor disposed at a specified distance from the dielectric substrate. Further, the dielectric filter includes input-output couplers coupled to an input-stage dielectric resonator and an output-stage dielectric resonator, in which the electrode of at least one of the input-stage dielectric resonator and the output-stage dielectric resonator has an opening whose configuration is polygonal, and the electrode of at least one of the dielectric resonators other than the input-stage and output-stage dielectric resonators has an opening whose configuration is substantially circular.

At least one of the input-stage and output-stage dielectric resonators uses the slot-mode which allows the coupling between the dielectric resonators and the input-output couplers to be strong, whereas at least one of the dielectric resonators other than the input-stage and output-stage dielectric resonators uses the TE010 mode having high Q0. Thus, a dielectric filter, which can obtain a required characteristic even in the range of 1% to 2% of the specific band, can be provided.

Furthermore, in the dielectric filter described above, at least one of the dielectric resonators other than the input-stage and output-stage dielectric resonators may have an electrode opening whose configuration is polygonal.

Since the coupling coefficient between the TE010-mode dielectric resonator and the slot-mode dielectric resonator is higher than the coupling coefficient between the TE010-mode dielectric resonators, the slot mode can be used in other dielectric resonators in addition to the input-stage and output-stage dielectric resonators as needed according to the relationship between specific bands and insertion losses. This permits a dielectric filter having a desired specific band and a desired insertion loss to be easily obtained.

Furthermore, the polygonal opening of this dielectric filter may be of rectangular form. Making the opening configuration of the electrode formed on the dielectric substrate rectangular permits the rectangular-slot mode to be easily usable as the resonance mode of the dielectric resonator.

Furthermore, in the dielectric resonator having a rectangular electrode opening in the dielectric filter described above, the length of the opening in one direction may be made longer than half of the wavelength in the fundamental resonance mode of the dielectric resonator so as to resonate in a higher mode than the fundamental resonance mode.

When the resonators resonate in a higher mode than the fundamental resonance mode, an electrical barrier with no losses is created between the bulges of the electric-field-strength distributions. The more the conductor losses are reduced due to the electrical barrier, the more the Q0 of the dielectric resonator is improved, and the more the insertion losses of the dielectric filter are reduced.

According to another aspect of the present invention, there is provided a dielectric duplexer including at least two dielectric filters, input-output couplers connected to each of the dielectric filters, and an antenna connector commonly connected to both of the dielectric filters, in which at least one of the dielectric filters is the dielectric filter described above.

According to another aspect of the present invention, there is provided a transceiver including the dielectric duplexer described above, a transmission circuit connected to at least one of the input-output couplers of the dielectric duplexer, a reception circuit connected to at least one of the input-output couplers, which is different from the input-output coupler connected to the transmission circuit, and an antenna connected to the antenna connector of the dielectric duplexer. The antenna may be removable.

This arrangement permits a dielectric duplexer and a transceiver capable of obtaining a required characteristic even in the range of 1% to 2% of the specific band to be obtained.

Other features and advantages of the present invention will become apparent from the following description of embodiments the invention which refers to the accompanying drawings.

DETAILED DESCRIPTION OF EMBODIMENTS OF THE INVENTION

Figure 1:
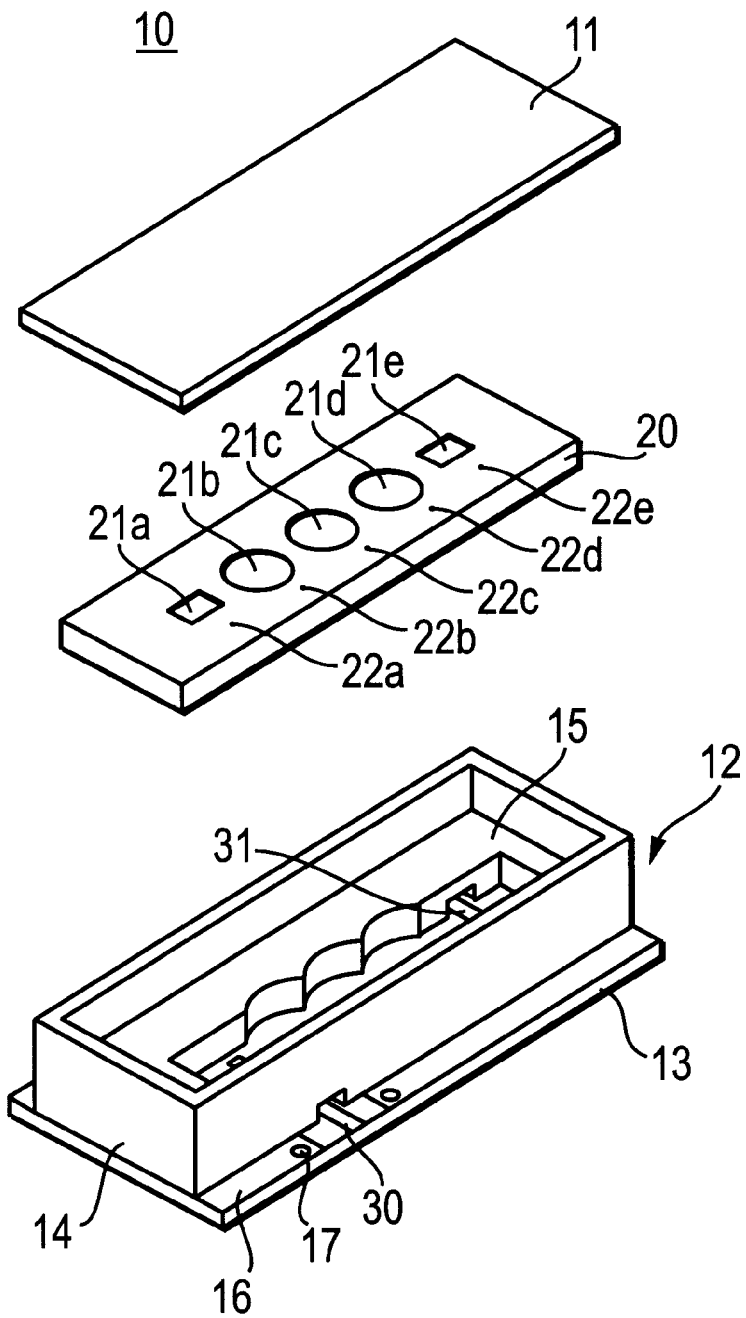
FIG. 1 is an exploded perspective view of a dielectric filter according to a first embodiment of the present invention.

FIG. 1 illustrates a first embodiment of a dielectric filter according to the present invention. The figure is an exploded perspective view of the dielectric filter used in this embodiment.

As shown in FIG. 1, a dielectric filter 10 of this embodiment includes a dielectric substrate 20, having an electrode formed on mutually opposing surfaces thereof, a lower case 12, and an upper case 11. In the electrode formed on the front surface (shown in FIG. 1) of the dielectric substrate 20, some parts of the electrode are removed to form two rectangular openings 21a and 21e and three circular openings 21b, 21c, and 21d therebetween. Other openings of the same configurations are formed at opposing positions in the electrode on the back surface. The parts defined by these openings 21a through 21e and the upper and lower cases 11 and 12 form dielectric resonators 22a through 22e. The resonance frequency is determined by the configurations of the openings 21a through 21e, the thickness of the dielectric substrate 20, and other well-known factors.

The lower case 12 is composed of a substrate 13 and a metal frame 14 mounted thereon. The dielectric substrate 20 is mounted on the metal frame 14, inside of which a step portion 15 is formed. An electrode 16 is formed at a specified part on a surface of the substrate 13. On a surface of the substrate 13, input and output micro-strip lines 30 and 31 provide an input coupler and an output coupler, respectively. An electrode is formed on substantially the entire back surface of the substrate 13. In addition, in order to exclude the influence of unnecessary modes, the electrode part except for the micro-strip lines 30 and 31 formed on the surface of the substrate 13 is electrically connected to the electrode on the back surface of the substrate 13 via a through-hole 17.

In the dielectric filter 10 having such a structure, the dielectric substrate 20, which is mounted on the step portion 15 inside the lower case 12, is fixed by a conductive adhesive material or the like. Additionally, the upper case 11 is mounted and fixed on the metal frame 14 of the lower case 12. In this arrangement, when input signals are input to the micro-strip line 30 as an input-output coupler, the micro-strip line 30 and the input-stage rectangular-slot mode dielectric resonator 22a make an electromagnetic-field coupling. After this coupling, the input-stage dielectric resonator 22a and the adjacent TE010-mode dielectric resonator 22b make an electromagnetic-field coupling, and then the TE010-mode dielectric resonators 22b through 22d mutually make couplings. Lastly, the adjacent TE010-mode dielectric resonator 22d and the output-stage rectangular-slot mode dielectric resonator 22e make a coupling to output signals from the micro-strip line 31 on the output side. In this case, the dielectric filter 10 serves as a five-stage band pass filter.

Figure 2:
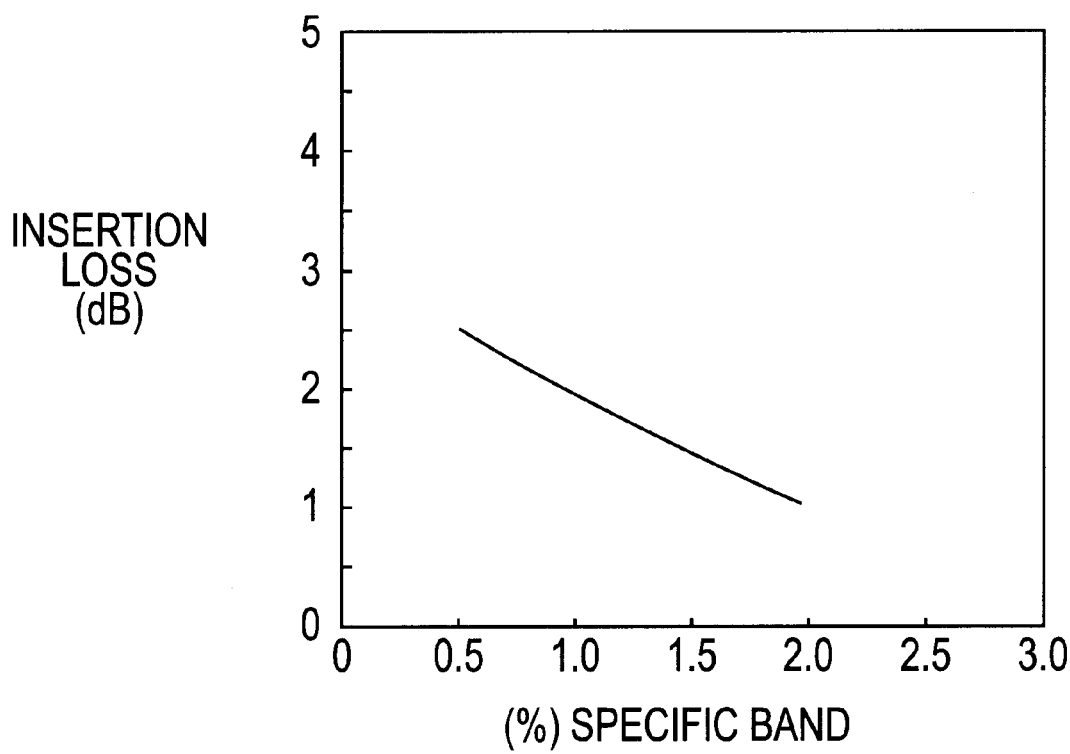
FIG. 2 is a graph showing the relationship between insertion losses and specific bands in the dielectric filter of the first embodiment of the present invention.

FIG. 2 is a graph showing the relationship between the insertion losses and the specific bands in the dielectric filter 10 used in this embodiment.

In this embodiment, the rectangular-slot mode dielectric resonators 22a and 22e used in the input-output stages are capable of obtaining a strong coupling between them and the input-output couplers 30 and 31, whereas the TE010-mode dielectric resonators 22b through 22d having a high Q0 are used in the stages other than the input-output stages. This permits a dielectric filter having insertion-loss characteristics of approximately 2 dB or lower even in the range of 1% to 2% of the specific band to be obtained, as shown in FIG. 2.

Figure 3:
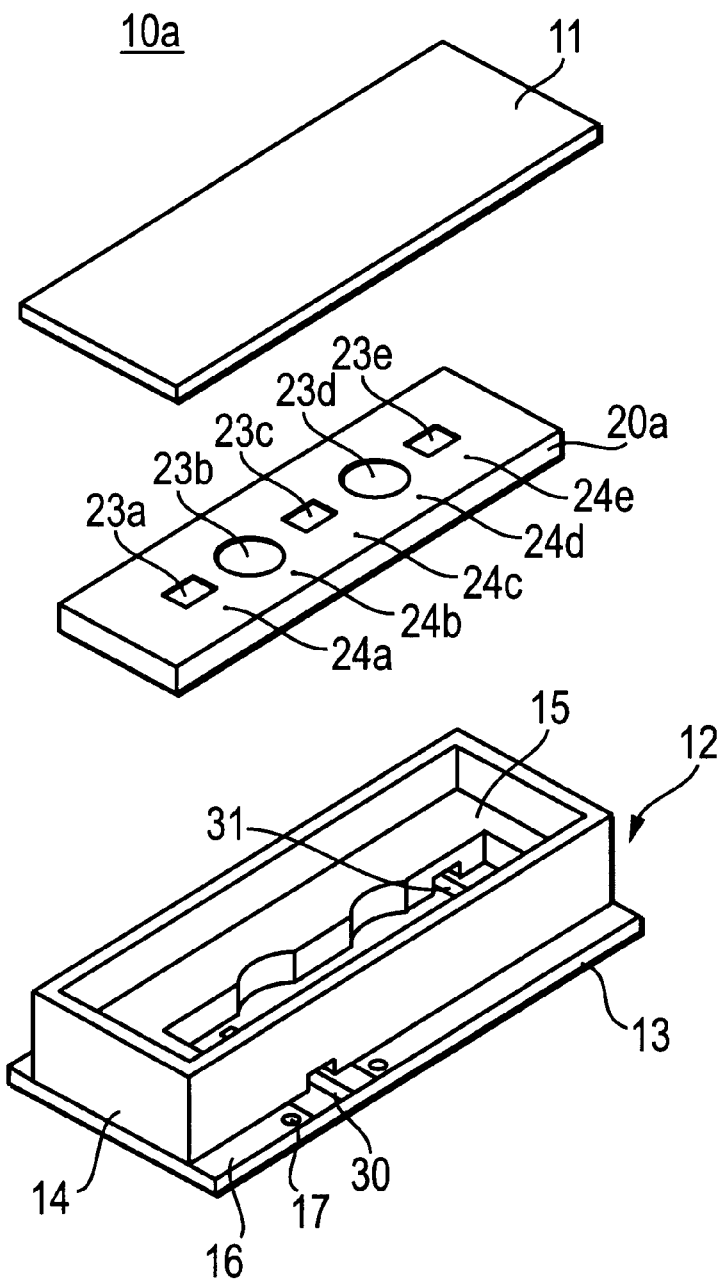
FIG. 3 is an exploded perspective view of a dielectric filter according to a second embodiment of the present invention.

Referring to FIG. 3, a description will be given of a dielectric filter according to a second embodiment of the present invention. FIG. 3 is an exploded perspective view of the dielectric filter used in this embodiment, in which the same parts as those shown in the first embodiment are given the same reference numerals and thus detailed explanations thereof are omitted.

The dielectric filter 10a of this embodiment, as shown in FIG. 3, is different from the first embodiment. Five stages of dielectric resonators 24a through 24e are composed of electrode openings 23a through 23e formed in a dielectric substrate 20a. The input-stage and output-stage dielectric resonators and also the third stage resonators are the rectangular-slot mode dielectric resonators 24a, 24e, and 24c, respectively, whereas the resonators of the second and fourth stages are TE010-mode dielectric resonators 22b and 22d, respectively.

Figure 4:
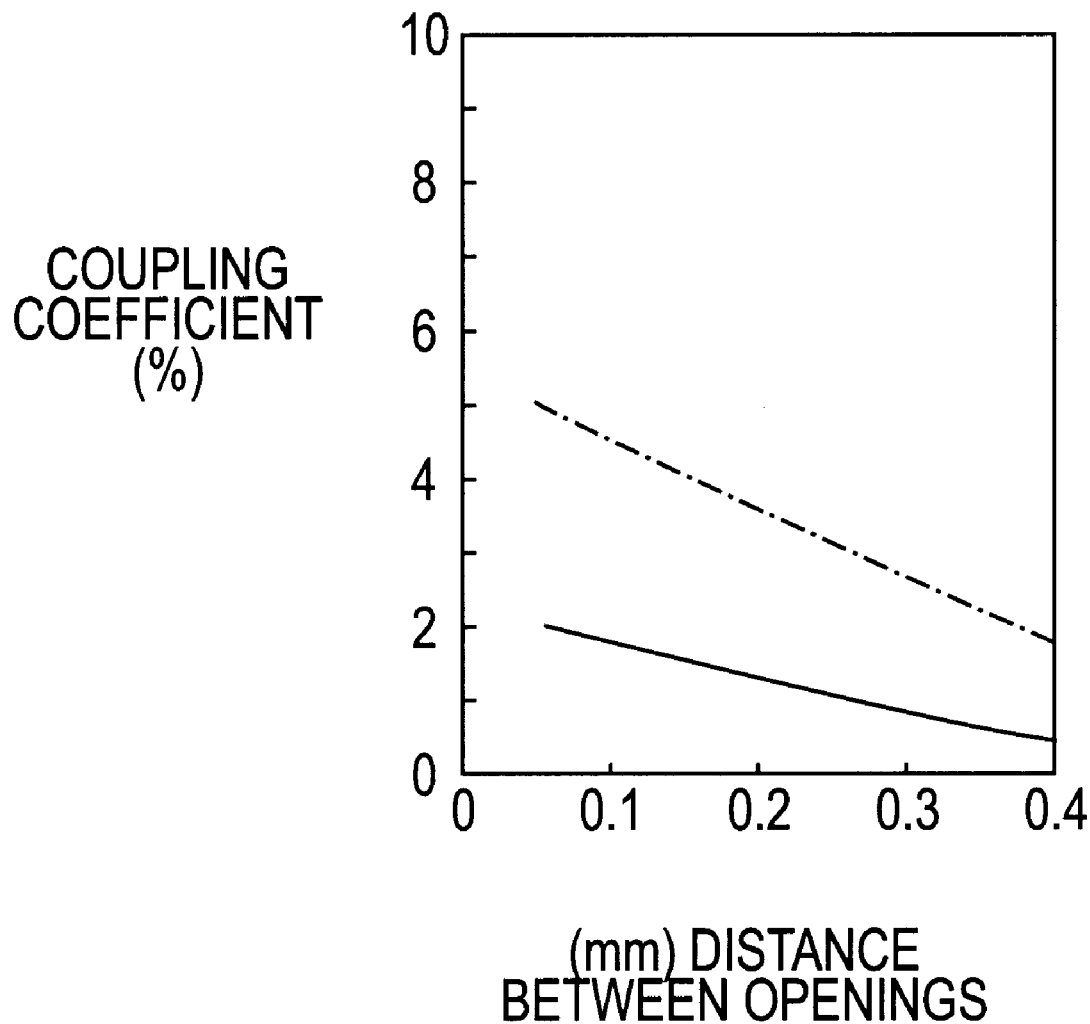
FIG. 4 is a graph showing the relationships between the coupling coefficients and the distances between the openings.

FIG. 4 is a graph showing the relationship between the coupling coefficients and the distances between the openings 23a to 23e in the electrode forming the dielectric resonators. The solid line indicates the relationship of couplings among the TE010-mode dielectric resonators, whereas the dotted line indicates the relationship of couplings between the TE010-mode dielectric resonators and the rectangular-slot mode dielectric resonators. As shown in FIG. 4, the coupling coefficients obtained between the TE010-mode dielectric resonators and the rectangular-slot mode dielectric resonators are higher than those obtained among the TE010-mode dielectric resonators. Therefore, this arrangement allows a dielectric filter having desired specific band and insertion loss to be easily obtained, in which the rectangular-slot mode is used in other dielectric resonators, in addition to those of the input and output stages, when necessary according to the relationship between specific bands and insertion losses.

Figure 5:
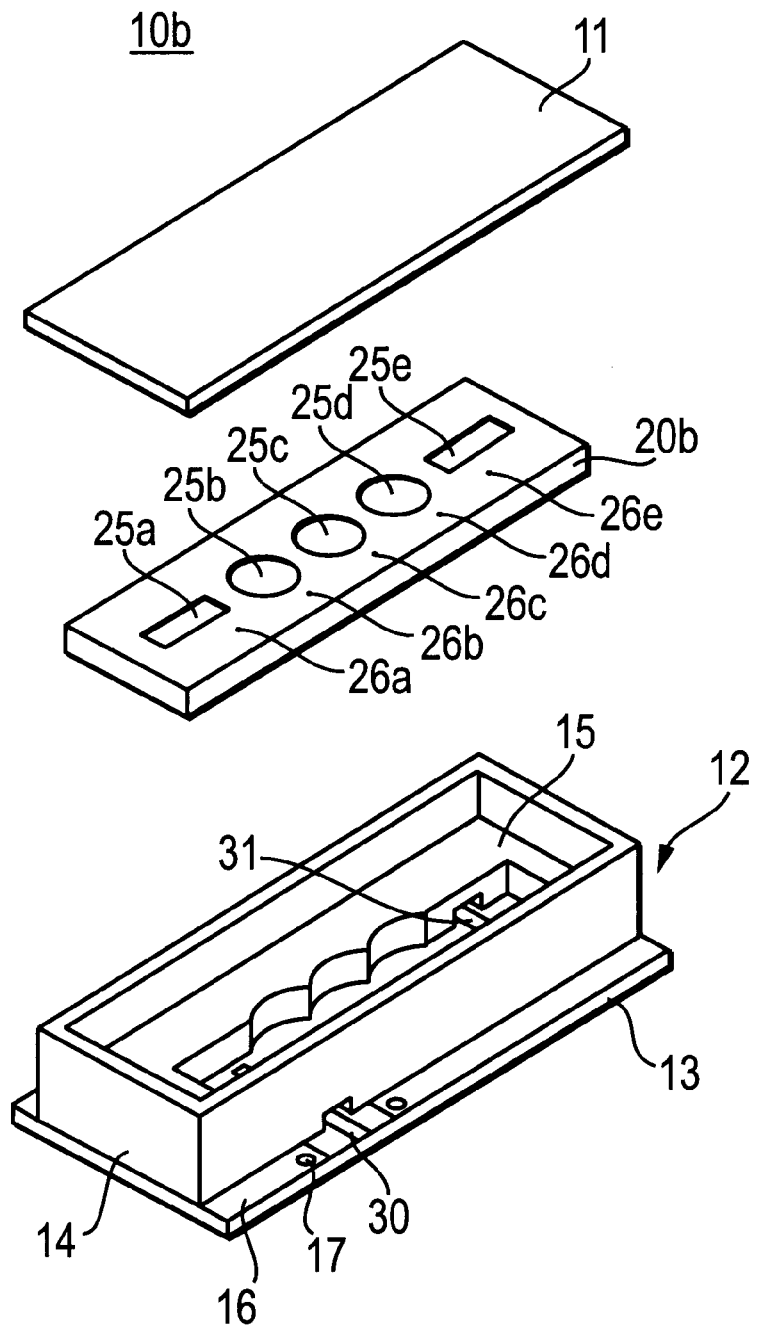
FIG. 5 is an exploded perspective view of a dielectric filter according to a third embodiment of the present invention.

Furthermore, a dielectric filter of a third embodiment of the present invention will be illustrated by referring to FIG. 5. This figure is an exploded perspective view of the dielectric filter of this embodiment, in which the same parts as those shown in the first embodiment are given the same reference numerals and thus detailed explanations thereof are omitted.

As shown in FIG. 5, in the dielectric filter lob of this embodiment, dielectric resonators 26b through 26d composed of electrode openings 25b through 25d, respectively, formed in a dielectric substrate 20b are the same as those shown in the first embodiment. However, the configurations of electrode openings 25a and 25e used in input and output stage dielectric resonators 26a and 26e, respectively, are different from those in the first embodiment. Specifically, the lengths of the openings, in the direction in which the dielectric resonators 26a through 26e are aligned, are two and a half times the wavelength in the fundamental resonance mode, whereby the second harmonic mode is used. In the case of the rectangular-slot mode, when the dielectric resonators are allowed to resonate in a higher mode than the fundamental resonance mode, an electric barrier with no loss is created between the bulges of the electric-field-strength distributions, and Q0 of the dielectric resonators is improved as the conductive loss due to the electric barrier is reduced. As a result, in the range of 1% to 2% of the specific band, insertion losses of the dielectric filter are further reduced.

Although these embodiments have adopted the micro-strip lines as input-output couplers, this is not essential to the present invention. For example, a non-radiative dielectric waveguide, a slot line, or a waveguide may be used to obtain the same advantages as the present invention.

Figure 6:
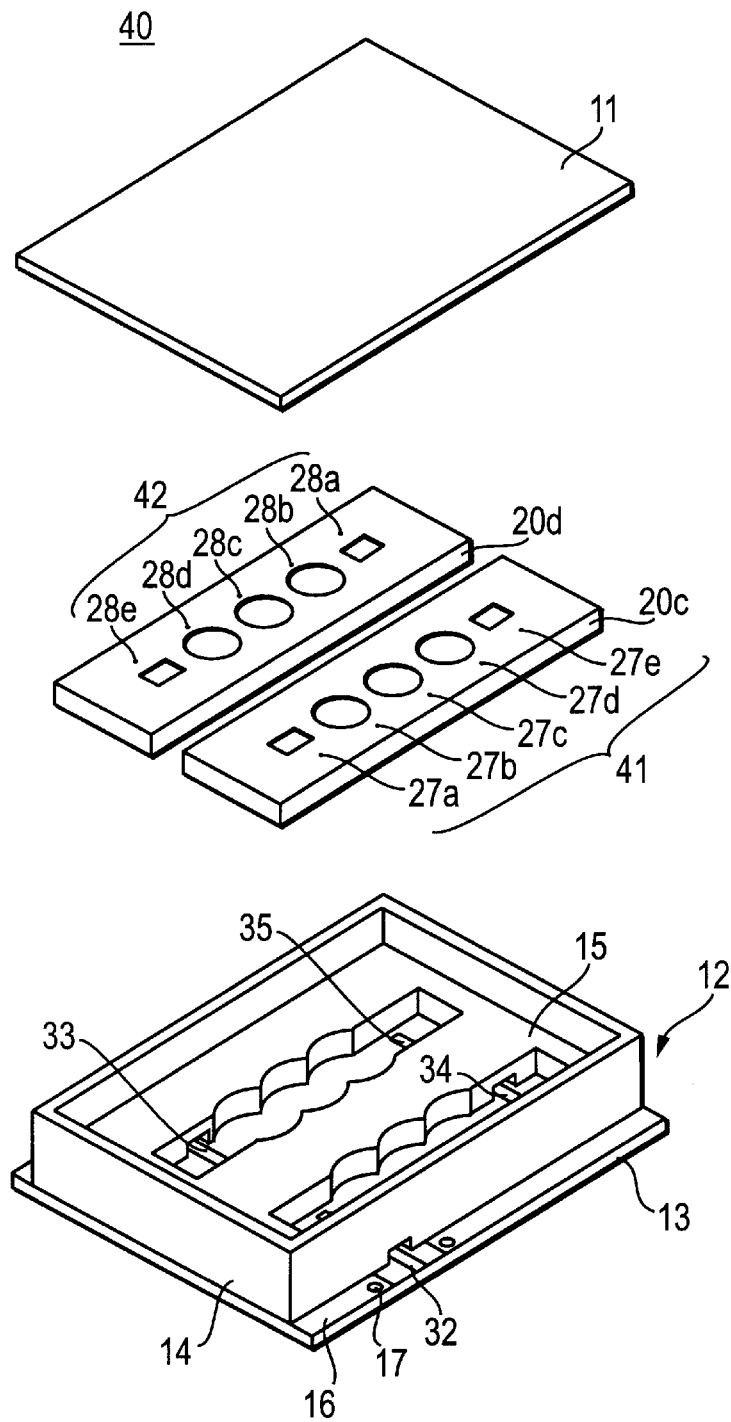
FIG. 6 is an exploded perspective view of a dielectric duplexer according to an embodiment of the present invention.

Referring to FIG. 6, a description will be given of a dielectric duplexer according to an embodiment of the present invention. FIG. 6 is an exploded perspective view of the dielectric duplexer of this embodiment.

As shown in FIG. 6, a dielectric duplexer 40 of this embodiment includes a first dielectric filter unit 41 composed of dielectric resonators 27a through 27e formed of five openings in a dielectric substrate 20c and a second dielectric filter unit 42 composed of dielectric resonators 28a through 28e formed of another five openings in a dielectric substrate 20c. The five dielectric resonators 27a through 27e forming the first dielectric filter unit 41 make electromagnetic-field couplings so as to serve as a transmission band pass filter. The five dielectric resonators 28a through 28e, having a different resonance frequency from that of the dielectric resonators 27a through 27e of the first dielectric filter unit 41, form the second dielectric filter unit 42. These dielectric resonators 28a through 28e also make electromagnetic-field couplings so as to serve as a reception band pass filter. A micro-strip line 32 coupled to the dielectric resonator 27a of the input stage in the first dielectric filter unit 41 is connected to an external transmission circuit. A micro-strip line 33 coupled to the dielectric resonator 28e of the output stage in the second dielectric filter unit 42 is connected to an external reception circuit. Furthermore, a micro-strip line 34 coupled to the dielectric resonator 27e of the output stage in the first dielectric filter unit 41 and a micro-strip line 35 coupled to the dielectric resonator 28a of the input stage in the second dielectric filter unit 42, are commonly connected to a micro-strip line (not shown) serving as an antenna connector, for being connected to an external antenna.

The dielectric duplexer 40 having such a structure allows signals of a specified frequency to be passed in the first dielectric filter unit 41, and allows signals of a different frequency from the specified frequency to be passed in the second dielectric filter unit 42 so as to serve as a band pass dielectric duplexer. In order to maintain isolation between the first dielectric filter unit 41 and the second dielectric filter unit 42, a partition (not shown) is placed between the first dielectric filter unit 41 and the second dielectric filter unit 42 of each of the upper case 11 and the lower case 12.

In the dielectric duplexer 40 of this embodiment, the input and output stage dielectric resonators 27a, 27e, 28a, and 28e of the first dielectric filter unit 41 and the second dielectric filter unit 42 are rectangular-slot mode dielectric resonators, whereas the other dielectric resonators 27b through 27d and 28b through 28d are TE010-mode dielectric resonators. This arrangement provides a dielectric duplexer, which can obtain a required insertion loss even in a range of 1% to 2% of the specific band.

Figure 7:
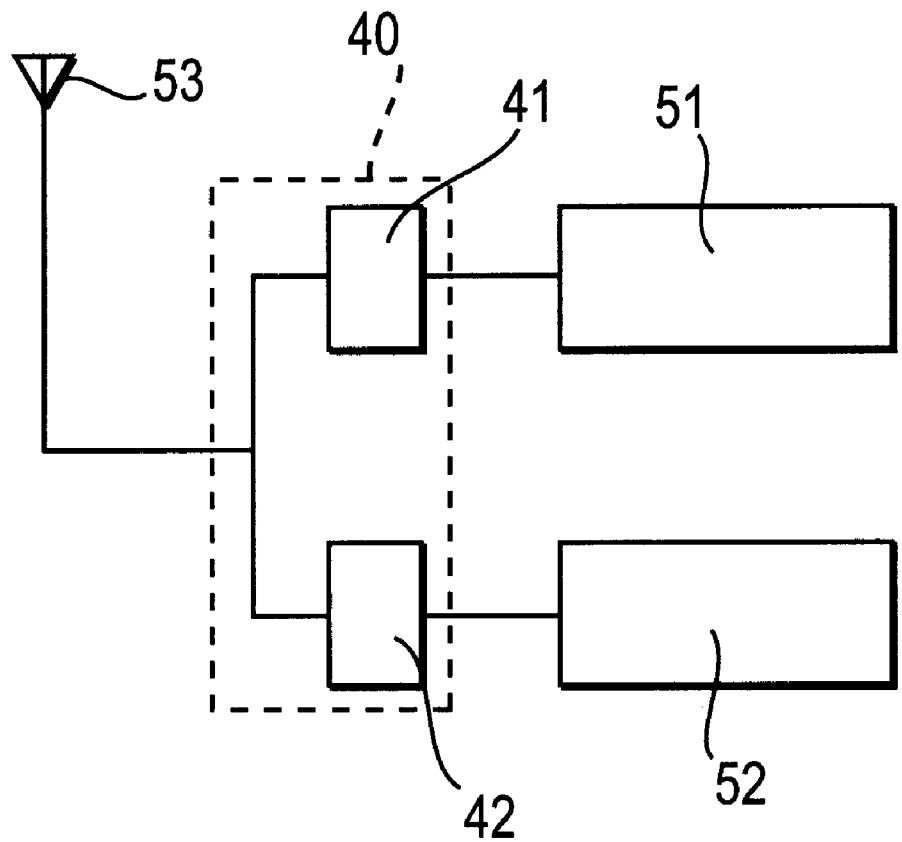
FIG. 7 is a schematic view of a transceiver according to an embodiment of the present invention.
Figure 8:
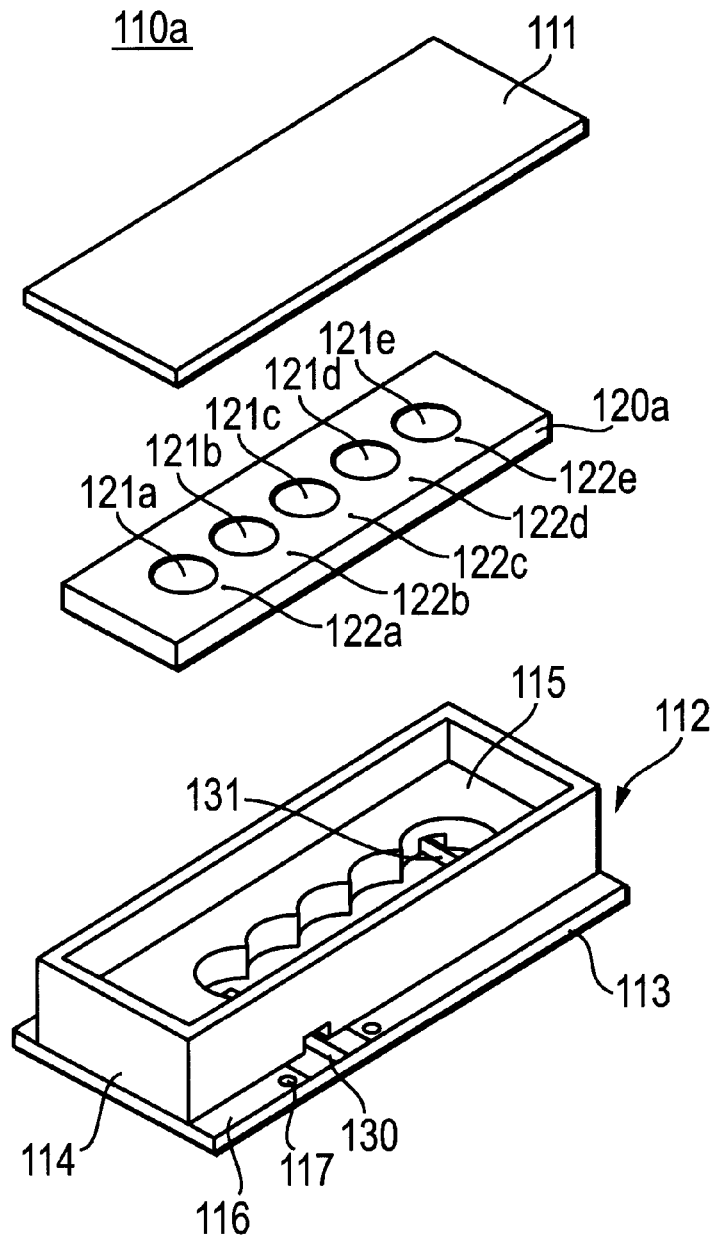
FIG. 8 is an exploded perspective view of a first conventional dielectric filter.
Figure 9:
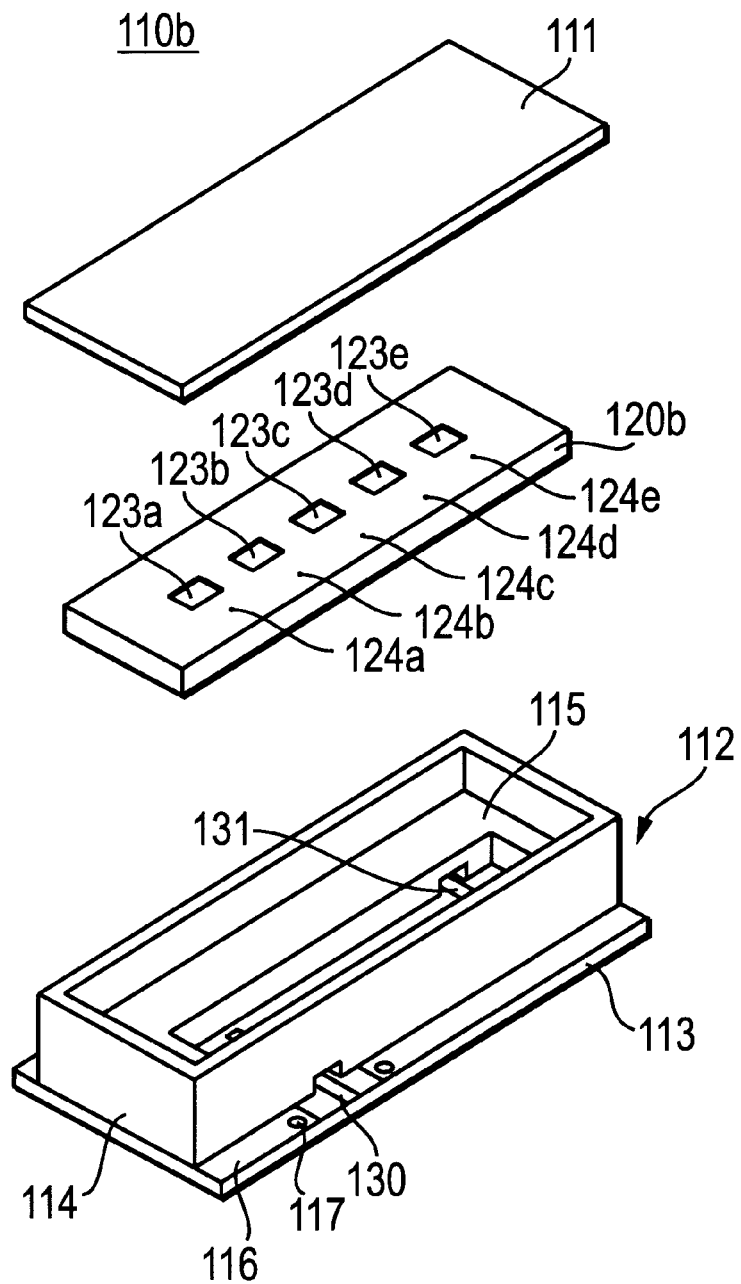
FIG. 9 is an exploded perspective view of a second conventional dielectric filter.
Figure 10:
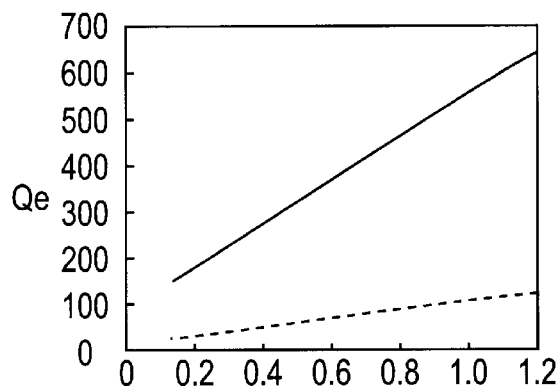
FIG. 10 is a graph showing the relationship between Qe and the distances between input-output couplers and a dielectric substrate.
Figure 11:
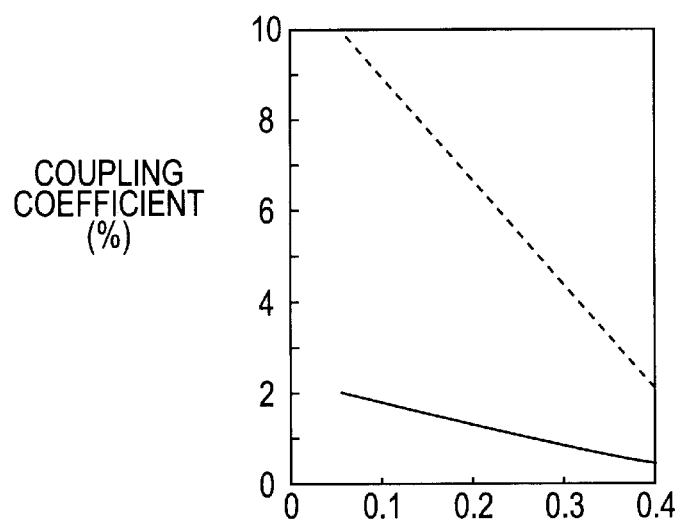
FIG. 11 is a graph showing the relationship between the coupling coefficients and the distances between the openings.
Figure 12:
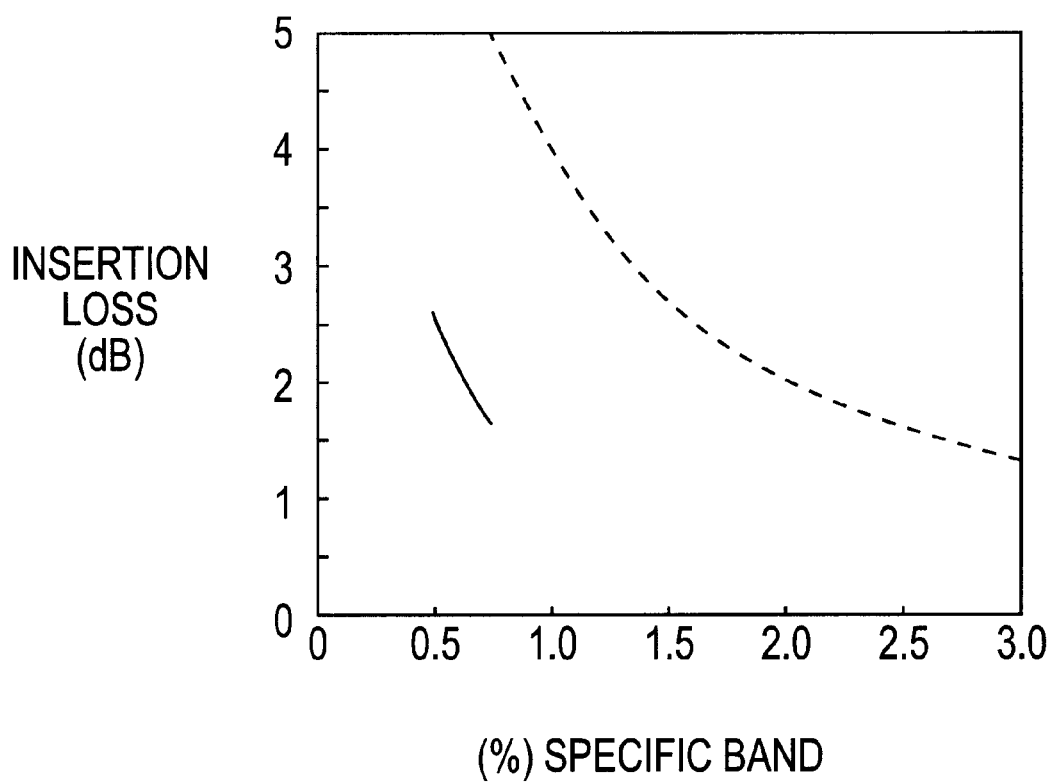
FIG. 12 is a graph showing the relationship between insertion losses and specific bands in the conventional dielectric filters.

Referring to FIG. 7, a transceiver of an embodiment according to the present invention will be illustrated. FIG. 7 is a schematic view of the transceiver of this embodiment.

As shown in FIG. 7, a transceiver 50 of this embodiment includes a dielectric duplexer 40, a transmission circuit 51, a reception circuit 52, and an antenna 53. In this case, the dielectric duplexer 40 is the same as that shown in the previous embodiment, in which the input-output coupler connected to the first dielectric filter unit 41 shown in FIG. 6 is connected to the transmission circuit 51, whereas the input-output coupler connected to the second dielectric filter unit 42 is connected to the reception circuit 52. The antenna connector is connected to the antenna 53.

In the dielectric duplexer 40 forming the transceiver 50 used in this embodiment, as in the case of the previous embodiment, the dielectric resonators of the input and output stages in the first dielectric filter unit 41 and the second dielectric filter unit 42 are rectangular-slot mode dielectric resonators, whereas the other dielectric resonators are TE010-mode dielectric resonators. This arrangement permits a transceiver, which can satisfy a required insertion loss even in a range of 1% to 2% of the specified band, to be obtained.

As described above, according to the present invention, in the dielectric filter including a plurality of dielectric resonators and input-output couplers, the slot-mode is used in at least one of the dielectric resonators of the input-output stages, whereas the TE010 mode is used in at least one of the other dielectric resonators. Since the slot-mode dielectric resonators are weak in electromagnetic-field confinement, the coupling between the dielectric resonators and the input-output couplers and the coupling between the dielectric resonators can be facilitated, whereas the TE010-mode dielectric resonators have high Q0 and their insertion losses are thereby small. Therefore, the dielectric filter having small insertion losses even in the range of 1% to 2% of the specific band can be obtained.

Although the present invention has been described in relation to particular embodiments thereof, many other variations and modifications and other uses will become apparent to those skilled in the art. Therefore, the present invention is not limited by the specific disclosure herein.

What is claimed is:

1. A dielectric filter comprising:

a plurality of dielectric resonators defined by a dielectric substrate, electrodes formed on mutually opposing surfaces thereof, a plurality of pairs of openings formed in the electrodes on the mutually opposing surfaces and corresponding respectively to the plurality of dielectric resonators, and a conductor disposed spaced away from the dielectric substrate by a specified distance; and input-output couplings coupled electromagnetically to an input-stage dielectric resonator and an output-stage dielectric resonator, respectively, among the plurality of dielectric resonators;

wherein a respective electrode opening corresponding to at least one of the input-stage dielectric resonator and the output-stage dielectric resonator has a polygonal configuration; and wherein at least one of the dielectric resonators other than the input-stage and output-stage dielectric resonators has an electrode opening whose configuration is substantially circular.

2. A dielectric filter according to claim 1, wherein at least another one of the dielectric resonators other than the input-stage and output-stage dielectric resonators has an electrode opening whose configuration is polygonal.

3. A dielectric filter according to claim 2, wherein the polygonal configuration is rectangular.

4. A dielectric filter according to claim 3, wherein in the dielectric resonator in which the electrode opening has a rectangular configuration, the length of the opening in one direction is longer than a half wavelength in a fundamental resonance mode of the dielectric resonator, so that said dielectric resonator resonates in a higher mode than the fundamental resonance mode.

5. A dielectric filter according to claim 1, wherein the polygonal configuration is rectangular.

6. A dielectric filter according to claim 5, wherein in the dielectric resonator in which the electrode opening has a rectangular configuration, the length of the opening in one direction is longer than a half wavelength in a fundamental resonance mode of the dielectric resonator, so that said dielectric resonator resonates in a higher mode than the fundamental resonance mode.

7. A dielectric duplexer comprising:

at least two dielectric filters, wherein at least one of the dielectric filters is the dielectric filter according to claim 1;

a first input-output coupling of one of said filters being a first input-output terminal of said duplexer;

a first input-output coupling of the other filter being a second input-output terminal of said duplexer;

the second input-output couplings of both said filters being connected in common to an antenna terminal of said duplexer.

8. The duplexer according to claim 7, wherein in said at least one filter, at least another one of the dielectric resonators other than the input-stage and output-stage dielectric resonators has an electrode opening whose configuration is polygonal.

9. The duplexer according to claim 8, wherein the polygonal configuration is rectangular.

10. The duplexer according to claim 9, wherein the dielectric resonator in which the electrode opening has a rectangular configuration, the length of the opening in one direction is longer than a half wavelength in a fundamental resonance mode of the dielectric resonator, so that said dielectric resonator resonates in a higher mode than the fundamental resonance mode.

11. A transceiver comprising:

the dielectric duplexer according to claim 7;

a transmission circuit connected to said first input-output terminal of the dielectric duplexer;

a reception circuit connected to said second input-output terminal of said duplexer.

12. The transceiver according to claim 11, further comprising an antenna connected to the antenna terminal of the dielectric duplexer.

13. The transceiver according to claim 11, wherein in said at least one of the dielectric filters, the electrode of at least another one of the dielectric resonators other than the input-stage and output-stage dielectric resonators has an electrode opening whose configuration is polygonal.

14. The transceiver according to claim 13, wherein in said at least another one of the dielectric resonators, the polygonal configuration is rectangular.

15. The transceiver according to claim 14, wherein in said at least another one of the dielectric resonators, in which the electrode opening has a rectangular configuration, the length of the opening in one direction is longer than a half wavelength in a fundamental resonance mode of the dielectric resonator, so that said dielectric resonator resonates in a higher mode than the fundamental resonance mode.

16. The transceiver according to claim 13, wherein in said at least one of the dielectric resonators, said polygonal configuration is rectangular.

17. The transceiver according to claim 16, wherein in said at least one of the dielectric resonators, in which the electrode opening has a rectangular configuration, the length of the opening in one direction is longer than a half wavelength in a fundamental resonance mode of the dielectric resonator, so that said dielectric resonator resonates in a higher mode than the fundamental resonance mode.

* * * * *